United States Patent
Cripsey

(10) Patent No.: US 9,157,516 B2
(45) Date of Patent: Oct. 13, 2015

(54) FLOW-FORMED DIFFERENTIAL CASE ASSEMBLY

(75) Inventor: Timothy J. Cripsey, Rochester, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 0 days.

(21) Appl. No.: 13/529,351

(22) Filed: Jun. 21, 2012

(65) Prior Publication Data

US 2012/0325047 A1 Dec. 27, 2012

Related U.S. Application Data

(60) Provisional application No. 61/499,929, filed on Jun. 22, 2011.

(51) Int. Cl.

| | |
|---|---|
| F16H 57/037 | (2012.01) |
| B23K 26/20 | (2014.01) |
| B23K 31/02 | (2006.01) |
| F16H 48/40 | (2012.01) |
| F16H 48/08 | (2006.01) |
| F16H 48/38 | (2012.01) |

(52) U.S. Cl.
CPC .......... *F16H 48/40* (2013.01); *F16H 2048/085* (2013.01); *F16H 2048/382* (2013.01); *Y10T 74/2186* (2015.01)

(58) Field of Classification Search
CPC .......... F16H 2057/02043; F16H 57/02; F16H 48/08; F16H 48/38; F16H 48/40
USPC ........ 74/606 R, 607; 475/220, 230–246, 331, 475/336; 29/893.2, 525.14
See application file for complete search history.

(56) References Cited

U.S. PATENT DOCUMENTS

| | | | | |
|---|---|---|---|---|
| 4,125,026 | A | * | 11/1978 | Torii et al. ...................... 475/230 |
| 5,320,587 | A | * | 6/1994 | Bodtker et al. ............... 475/230 |
| 6,589,671 | B1 | * | 7/2003 | Kehrer .......................... 428/683 |
| 6,863,636 | B2 | | 3/2005 | Huber et al. |
| 7,008,345 | B2 | * | 3/2006 | Phelan et al. ................. 475/231 |
| 7,021,171 | B2 | | 4/2006 | Huber et al. |
| 7,213,435 | B2 | | 5/2007 | Huber et al. |
| 7,328,492 | B2 | | 2/2008 | Huber et al. |
| 7,341,539 | B2 | | 3/2008 | Huber et al. |

(Continued)

FOREIGN PATENT DOCUMENTS

| | | | |
|---|---|---|---|
| DE | 102008017221 A1 | | 10/2008 |
| EP | 1719572 | * | 8/2006 |
| EP | 1719572 A2 | | 11/2006 |

OTHER PUBLICATIONS

Translation of EP 1719572, obtained May 3, 2013.*

*Primary Examiner* — Richard W Ridley
*Assistant Examiner* — Brian McGovern
(74) *Attorney, Agent, or Firm* — Fraser Clemens Martin & Miller LLC; James D. Miller

(57) ABSTRACT

A differential case assembly includes a differential case and an integral end cap and ring gear assembly. The differential case has an open end and a side wall with an exterior surface. The integral end cap and ring gear assembly is disposed over the open end of the differential case and adjacent the exterior surface. A first interior portion of the integral end cap and ring gear assembly abuts the exterior surface of the differential case to define a weld joint interface. The integral end cap and ring gear assembly is configured to permit a welding operation at the weld joint interface.

16 Claims, 5 Drawing Sheets

(56) References Cited

U.S. PATENT DOCUMENTS

| | | |
|---|---|---|
| 7,766,575 B2 | 8/2010 | Huber et al. |
| 2003/0200832 A1* | 10/2003 | Ootsuka .................. 74/606 R |
| 2004/0116235 A1* | 6/2004 | Szuba ...................... 475/230 |
| 2005/0009662 A1* | 1/2005 | Sudou ...................... 475/231 |
| 2006/0063634 A1* | 3/2006 | Szuba ...................... 475/230 |
| 2008/0188343 A1* | 8/2008 | Pan et al. ................. 475/230 |
| 2009/0205463 A1* | 8/2009 | Gianone et al. ......... 74/606 R |
| 2009/0217725 A1 | 9/2009 | Cripsey et al. |
| 2009/0266198 A1* | 10/2009 | Nosakowski ............ 74/606 R |
| 2010/0062892 A1* | 3/2010 | Vogel et al. ............. 475/230 |
| 2010/0130325 A1* | 5/2010 | Gutmann .................. 475/230 |
| 2011/0263374 A1 | 10/2011 | Cripsey et al. |
| 2012/0000314 A1 | 1/2012 | Cripsey et al. |

* cited by examiner

FLOW-FORMED DIFFERENTIAL CASE ASSEMBLY

CROSS-REFERENCE TO RELATED APPLICATIONS

This application claims the benefit of U.S. Provisional Patent Application No. 61/499,929 filed on Jun. 22, 2011. The entire disclosure of the above application is hereby incorporated herein by reference.

FIELD OF THE INVENTION

The present disclosure relates to a differential case assembly and, more particularly, to a differential case assembly for use in a motorized vehicle.

BACKGROUND OF THE INVENTION

A differential is a device, usually employing gears, that is capable of transmitting torque and permitting rotation of different shafts at different speeds. Known differentials have cases that are cast from metals such as iron, and are often heavy and volumetrically undesirable. Assembly of known differentials can be difficult, oftentimes requiring bolting as well as welding. The use of "feed-in and rotate processes" when cast iron differential cases are manufactured is also known. Welding of the differentials formed from cast iron, in particular, can undesirably require the use of filler wire to provide an acceptable weld.

A particular differential case assembly is described in Assignee's co-pending U.S. Patent Application Publication No. 20110263374 to Cripsey, filed on Apr. 26, 2011, the entire disclosure of which is hereby incorporated herein by reference. The differential case assembly includes a differential case having an open end and a side wall with an interior surface. A plurality of major internal splines is formed on the interior surface of the side wall. The differential case assembly further includes a gear assembly. The gear assembly has a retainer insert and a cross pin. The retainer insert is disposed adjacent the interior surface of the side wall between a pair of the major internal splines. The retainer insert has a hole formed therein. The cross pin has an end mounted in the hole of the retainer insert. The cross pin aligns the gear assembly within the differential case.

There is a continuing need for a differential case assembly that is lighter compared to known cast iron designs, minimizes a required packaging space, minimizes assembly complexity, and can be employed with different numbers of gears. A differential case assembly that facilitates welding and eliminates a need for multiple nuts/bolts in the assembly process is also desired.

SUMMARY OF THE INVENTION

In concordance with the instant disclosure, a differential case assembly that is lighter compared to known cast iron designs, minimizes a required packaging space, minimizes assembly complexity, can be employed with different numbers of gears, facilitates welding, and eliminates a need for multiple nuts/bolts in the assembly process, is surprisingly discovered.

In one embodiment, a differential case assembly includes a differential case and an integral end cap and ring gear assembly. The differential case has an open end and a side wall with an exterior surface. The integral end cap and ring gear assembly is disposed over the open end of the differential case and adjacent the exterior surface. A first interior portion of the integral end cap and ring gear assembly abuts the exterior surface of the differential case to define a weld joint interface. A second interior portion of the integral end cap and ring gear assembly is spaced apart from the exterior surface and defines a void therebetween. The void permits a welding operation of the differential case to the integral end cap and ring gear assembly at the weld joint interface.

In another embodiment, a differential case assembly includes a differential case and an integral end cap and ring gear assembly. The differential case has an open end and a side wall with an exterior surface. The integral end cap and ring gear assembly is disposed over the open end of the differential case and adjacent the exterior surface. A first interior portion of the integral end cap and ring gear assembly abuts the exterior surface of the differential case to define a weld joint interface. The integral end cap and ring gear assembly has a plurality of slots formed therein that permit access to both the differential case and the integral end cap and ring gear assembly for a welding operation at the weld joint interface.

In a further embodiment, a method for manufacturing a differential case assembly includes the steps of: providing a differential case having an open end and a side wall with an exterior surface; and disposing an integral end cap and ring gear assembly over the open end of the differential case and adjacent the exterior surface. A first interior portion of the integral end cap and ring gear assembly abuts the exterior surface of the differential case to define a weld joint interface. The integral end cap and ring gear assembly further includes at least one of a second interior portion spaced apart from the exterior surface and defining a void therebetween, and a plurality of slots. Each of the void and the slots permits a welding operation of the differential case to the integral end cap and ring gear assembly at the weld joint interface. The method further includes the step of welding the differential case with the integral end cap and ring gear assembly at the weld joint interface.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
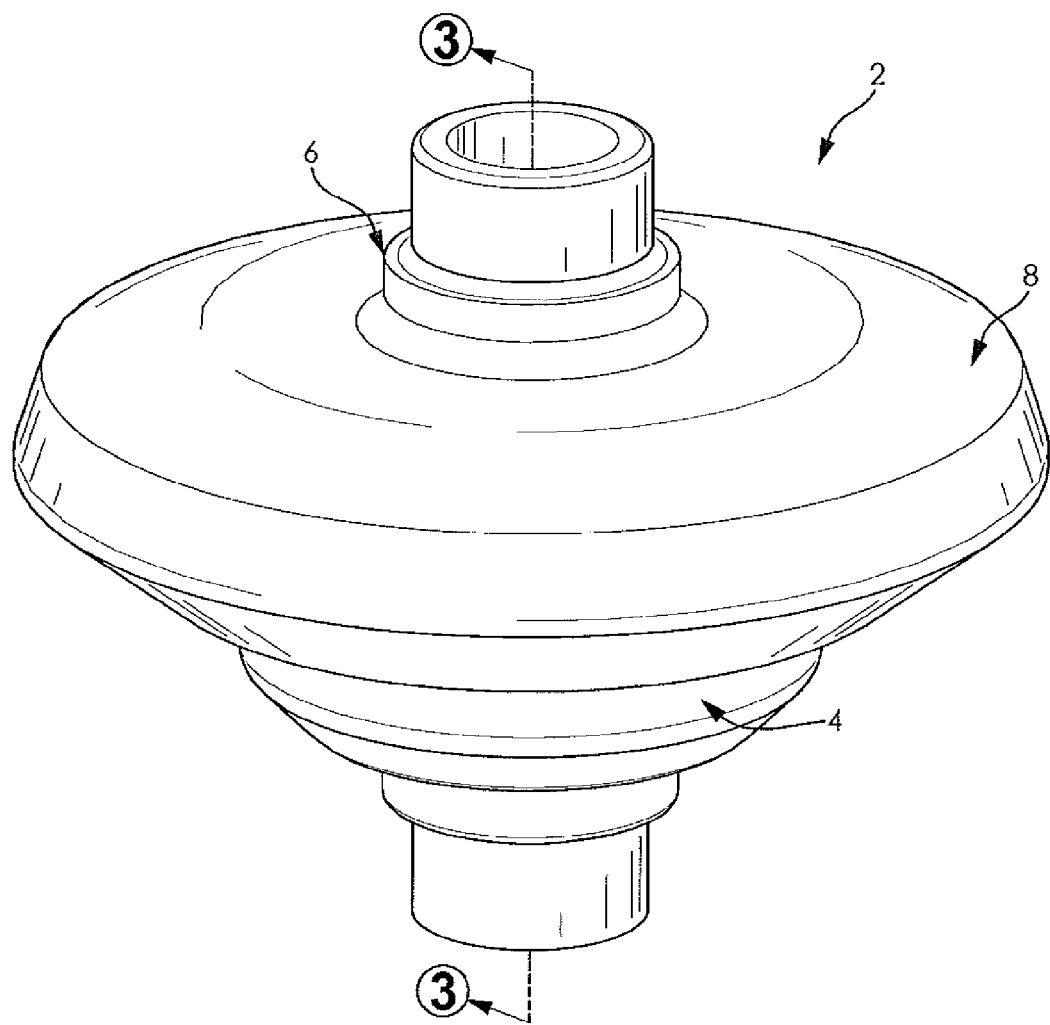
FIG. 1 is a perspective view of a differential case assembly according to one embodiment of the present disclosure, the differential case assembly having an integral end cap and ring gear assembly.
Figure 2:
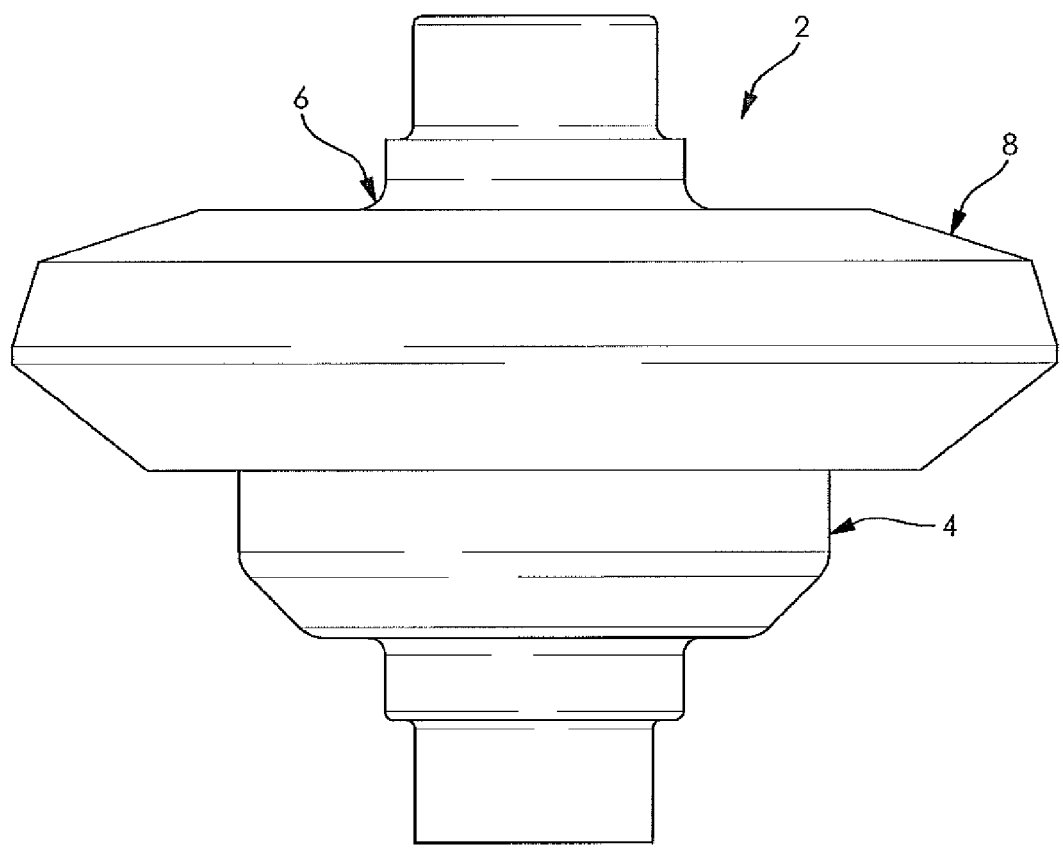
FIG. 2 is a side elevational view of the differential case assembly shown in FIG. 1.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

FIGS. 1-8 depict a differential case assembly 2 according to the present disclosure. The differential case assembly 2 advantageously permits a welding operation from at least one of from "below" the differential case assembly 2 (FIGS. 1-4) and "above" the differential case assembly (FIGS. 5-8), as desired.

The differential case assembly 2 includes a differential case 4, an end cap 6, a ring gear 8, and a gear assembly 10. The differential case 4, the end cap 6, and the ring gear 8 cooperate to house the gear assembly 10. It should be understood that the gear assembly 10 may have a cross pin, for example, as disclosed in Assignee's co-pending U.S. patent application Ser. No. 13/094,406, or may be pinless, for example, as disclosed in Assignee's co-pending pending U.S. patent application Ser. No. 13/174,971, the entire disclosures of which are hereby incorporated herein by reference.

Figure 3:
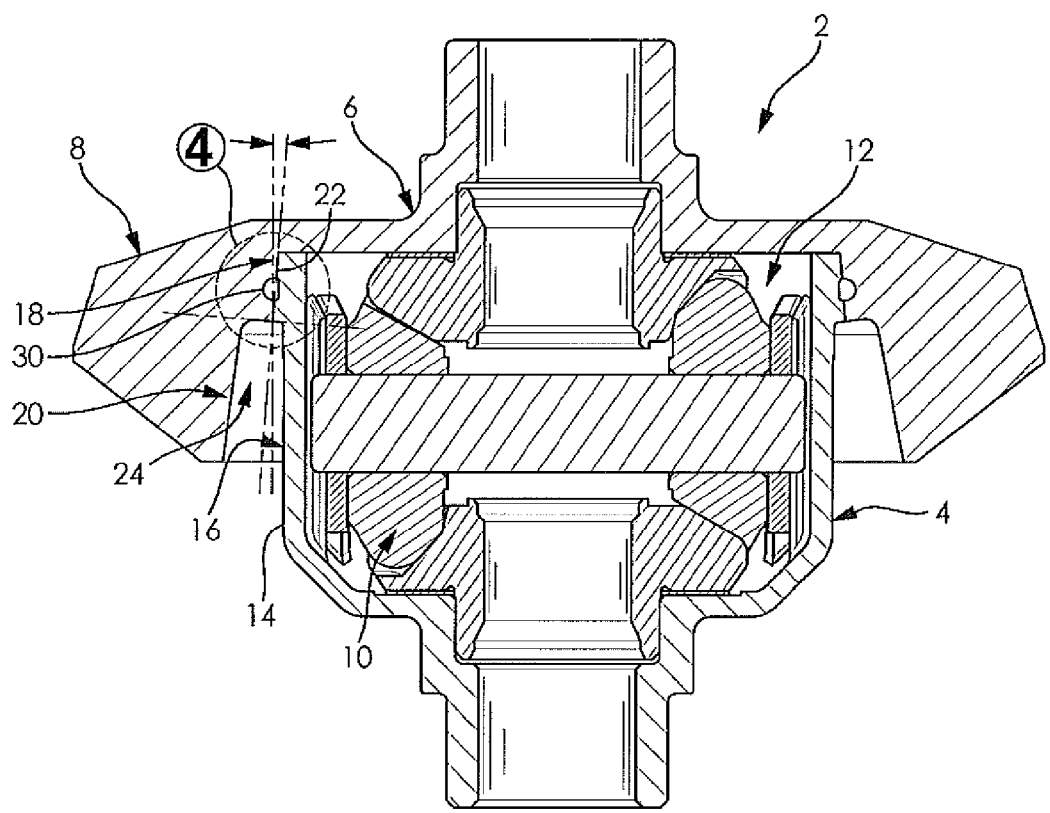
FIG. 3 is a side cross-sectional elevational view of the differential case assembly taken along section line 3-3 in FIG. 1.

As shown in FIG. 3, the differential case 4 has an open end 12 and a side wall 14 with an exterior surface 16. In a non-limiting example, the differential case 4 is a flow formed shell. Skilled artisans should appreciate that the flow forming process for manufacturing the differential case 4 results in a plastic deformation of the preform and a non-interrupted grain flow for the formed differential case 4. Through plastic deformation, the preform material undergoes work hardening and can become stronger than the original preform material. The flow formed differential case 4 furthermore has minimal porosity and can be made thinner by wall reduction, and significantly lighter in comparison to cast iron differential case assemblies known in the art. Other methods for forming the differential case 4 may also be used, as desired The end cap 6 and the ring gear 8 may be provided as a one piece, integral end cap and ring gear assembly 6, 8. The integral end cap and ring gear assembly 6,8 are disposed over the open end 12 of the differential case 4 and adjacent the exterior surface 16 of the side wall 14. For example, the integral end cap and ring gear assembly 6, 8 may have an outwardly extending edge portion that permits the integral end cap and ring gear assembly 6, 8 to be placed over top of the differential case 4, while also disposing the outwardly extending edge portion adjacent the side wall 14 of the differential case 4. The integral end cap and ring gear assembly 6, 8 may be cold formed or hot formed, or formed by another suitable process, within the scope of the present disclosure.

With reference to FIGS. 1-4, the integral end cap and ring gear assembly 6, 8 has a first interior portion 18 and a second interior portion 20. The first interior portion 18 of the integral end cap and ring gear assembly 6, 8 abuts the exterior surface 16 of the differential case 4. For example, a portion of the exterior surface 16 that abuts the first interior portion 18 of the integral end cap and ring gear assembly 6, 8 may be defined by an outwardly extending lip 21 of the differential case 4 adjacent the open end 12 of the differential case 4. Other means for defining the portion of the exterior surface 16 that abuts the first interior portion 18 may also be used, as desired.

The abutting of the exterior surface 16 and the first interior portion 18 defines a weld joint interface 22 of the differential case assembly 2. The second interior portion 20 of the integral end cap and ring gear assembly 6, 8 is spaced apart from the exterior surface 16. The second interior portion 20 and the exterior surface 16 together define a void 24 therebetween. The void 24 permits the welding operation of the differential case 4 to the integral end cap and ring gear assembly 6, 8 from "below" the differential case assembly 2, at the weld joint interface 22.

Figure 4:
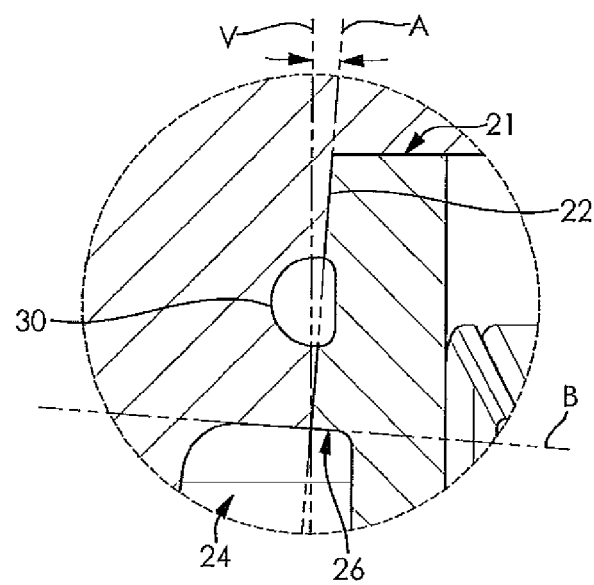
FIG. 4 is a fragmentary enlarged side cross-sectional view of the differential case assembly taken at call out 4 in FIG. 3, and further showing an angled void opening that permits a welding of the differential case assembly.
Figure 5:
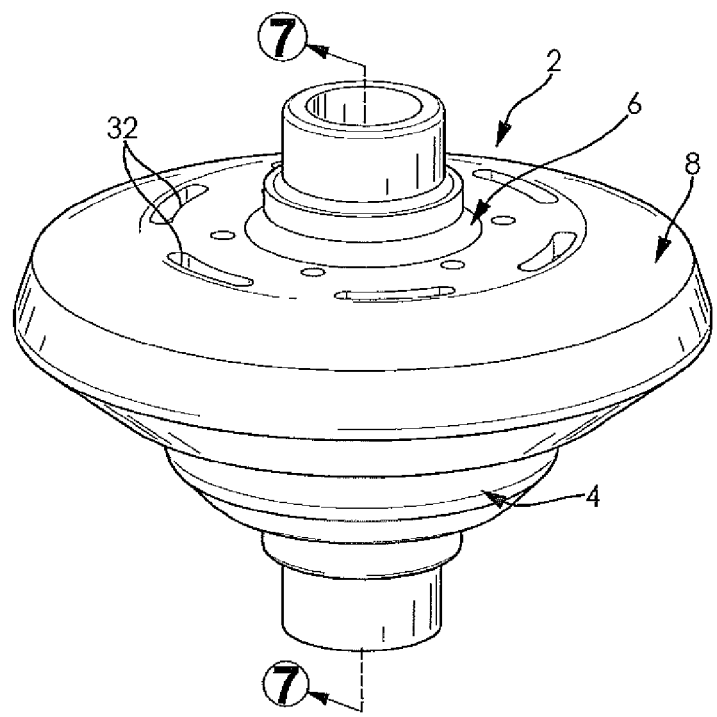
FIG. 5 is a perspective view of a differential case assembly according to another embodiment of the present disclosure, the differential case assembly having an integral end cap and ring gear assembly.
Figure 6:
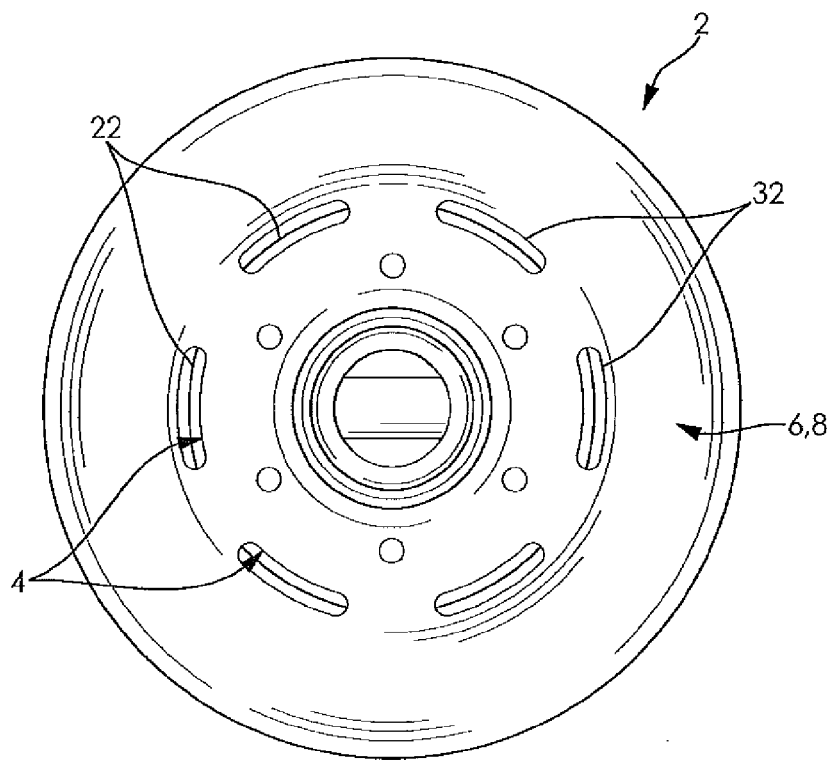
FIG. 6 is a top plan view of the differential case assembly shown in FIG. 5.

As illustrated in FIGS. 3 and 4, it has been surprising found that having the weld joint interface 22 be disposed along a plane A facilitates the welding operation of the weld joint interface 22. The plane A is oriented at an acute angle relative to a vertical plane V. As such, the weld joint interface 22 is angled or tapered and permits the integral end cap and ring gear assembly 6, 8 to be pressed into the differential case 4 during assembly. A surface of the second interior portion 20 of the integral end cap and ring gear assembly 6, 8 may also be parallel with the plane A, for the purpose of facilitating welding access to the weld joint interface 22.

As a nonlimiting example, the vertical plane V may be substantially parallel to exterior surface 16 of the side wall 14 adjacent the second interior portion 20 of the integral end cap and ring gear assembly 6, 8. The angle may particularly be up to about 15 degrees, more particularly between about 5-10 degrees, and most particularly about 7.5 degrees. One of ordinary skill in the art may select other suitable angles for the acute angle of the plane A, as desired.

Referring further to FIGS. 3 and 4, it is also surprisingly found that the welding operation is facilitated where a base 26 of the lip 21 is disposed on a plane B. The plane B is oriented orthogonal to the plane A of the portion of the exterior surface 16 that abuts the first interior portion 18 of the integral end cap and ring gear assembly 6, 8. Where a means for welding such as a laser is used for the welding operation, and the means for welding is oriented along the plane A, in line with the weld joint interface 22, the base 26 being disposed on the plane B results in a more consistent heating and welding at the weld joint interface 22.

As also shown in FIGS. 3 and 4, the differential case assembly 2 may further include a minor void 30 at the weld joint interface 22. In particular, the minor void 30 is disposed between exterior surface 16 of the side wall 14 of the differential case 4 and the first interior portion 18 of the integral end cap and ring gear assembly 6, 8. The minor void 30 may be defined by grooves formed in at least one of the exterior surface 16 and the first interior portion 18. The minor void 30 permits a collection of gases that may be generated during the welding operation, and facilitates the formation of a superior weld at the weld joint interface 22.

Referring now to FIGS. 5-8, the differential case assembly 2 of the present disclosure may also permit the welding operation from "above" the differential case assembly 2. The welding operation may be performed through a plurality of slots 32 that are formed in the integral end cap and ring gear assembly 6, 8. For example, the slots 32 may permit access to both the differential case 4 and the integral end cap and ring gear assembly 6, 8 for the welding operation. The slots 32 are also spaced apart, which results in a series of stitch-type or intermittent welds during the welding operation.

Figure 7:
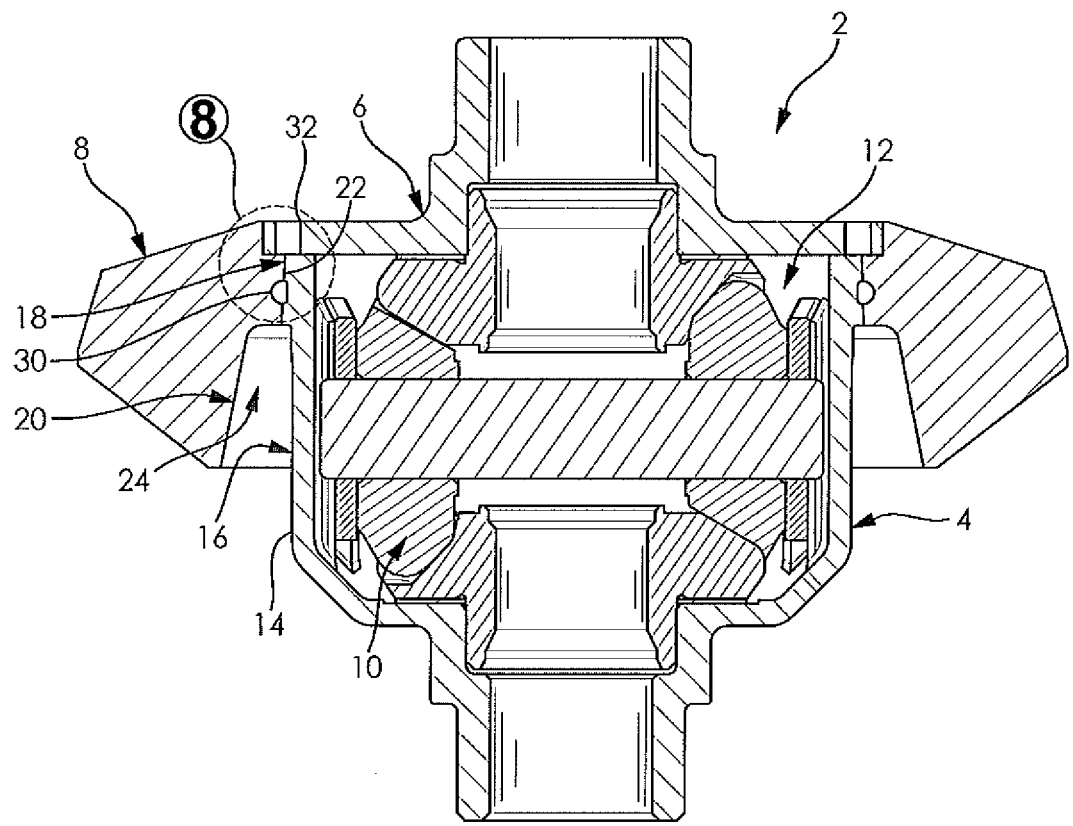
FIG. 7 is a side cross-sectional elevational view of the differential case assembly taken along section line 7-7 in FIG. 5.
Figure 8:
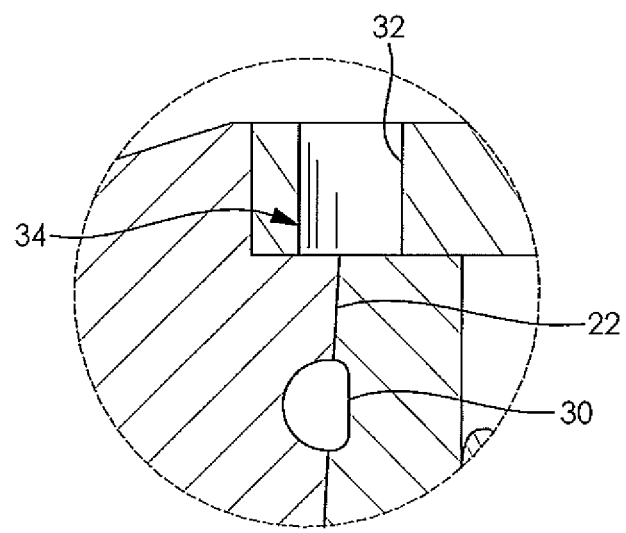
FIG. 8 is a fragmentary enlarged side cross-sectional view of the differential case assembly taken at call out 8 in FIG. 7, and further showing a slot in the integral end cap and ring gear assembly that permits a welding of the differential case assembly.

In a particular embodiment illustrated in FIGS. 7 and 8, a ledge 34 is formed in the integral retaining cap and ring gear assembly 6, 8. The ledge 34 exposes the weld joint interface 22 beneath each of the slots 32. In certain embodiments, the ledge 34 provides an outer half of the weld joint interface 22 exposed beneath each of the slots 32. Where the weld joint interface 22 is exposed thusly, it should be appreciated that the welding operation may be performed from "above" the differential case assembly 2. The welding operation from "above" may be performed together with, or separate from, the welding operation performed from "below" on the differential case assembly 2.

The present disclosure also includes a method for manufacturing the differential case assembly 2. The method first includes the steps of providing the differential case 4 and disposing the integral end cap and ring gear assembly 6, 8 over the open end 12 of the differential case 4 and adjacent the exterior surface 16 of the side wall 14 of the differential case 4. The disposing of the integral end cap and ring gear assembly 6, 8 over the open end 12 of the differential case 4 results in an abutting of the differential case 4 and the integral end cap and ring gear assembly 6, 8, and the subsequent formation of a weld joint interface 22.

The differential case assembly 2 may be configured for at least one of the "below" welding operation and the "above" welding operation at the weld joint interface 22, as described hereinabove. Accordingly, the method for manufacturing the differential case assembly 2 further includes the step of welding the differential case 4 with the integral end cap and ring gear assembly 6, 8 at the weld joint interface 22, either through the void 24 below the weld joint interface 22 or through the slots 32 above the weld joint interface 22.

In particular embodiments, the welding operation is a laser welding operation. However, one of ordinary skill in the art may select other suitable means for welding during the welding operation, as desired.

Advantageously, the differential case assembly 2 of the present disclosure is less massive and more volumetrically efficient than differentials for motorized vehicles that are known in the art. Furthermore, the differential case assembly 2 may be manufactured without the use of screws, bolts, rivets, or the like.

While certain representative embodiments and details have been shown for purposes of illustrating the invention, it will be apparent to those skilled in the art that various changes may be made without departing from the scope of the disclosure, which is further described in the following appended claims.

What is claimed is:

1. A differential case assembly, comprising:
   a gear assembly;
   a differential case having an open end and a side wall with an exterior surface, the open end having an opening configured to receive the gear assembly therethrough, at least a portion of the exterior surface of the side wall forming an outwardly extending lip adjacent the opening, the exterior surface of the side wall having a base spaced apart from the lip;
   an integral end cap and ring gear assembly disposed over the open end of the differential case and adjacent the exterior surface, the integral end cap and ring gear assembly covering a portion of the opening at the open end of the differential case and cooperating with the differential case to house the gear assembly, a first interior portion of the integral end cap and ring gear assembly abutting the exterior surface of the differential case to define a weld joint interface between the lip and the base, a second interior portion of the integral end cap and ring gear assembly spaced apart from the exterior surface and defining a void therebetween, the void permitting a first welding operation of the differential case to the integral end cap and ring gear assembly at the weld joint interface adjacent the base, wherein a diameter of the weld joint interface decreases from the base towards the lip, the integral end cap and ring gear assembly has a plurality of slots formed therethrough, each slot exposing a respective portion of the lip and the weld joint interface adjacent the lip, each slot permitting access to both the differential case and the integral end cap and ring gear assembly for a second welding operation of the differential case to the integral end cap and ring gear assembly at the weld joint interface adjacent the lip;
   a first weld formed by the first welding operation at the weld joint interface adjacent the base;
   a plurality of intermittent second welds formed by the second welding operation at the weld joint interface adjacent the respective portion of the lip exposed by each slot; and
   a minor void disposed at the weld joint interface between the exterior surface of the side wall of the differential case and the first interior portion of the integral end cap and ring gear assembly, minor void permitting a collection of gases during at least one of the first welding operation and the second welding operation.

2. The differential case assembly of claim 1, wherein the weld joint interface is disposed on a plane oriented at an acute angle relative to a central axis of the differential case.

3. The differential case assembly of claim 2, wherein the angle is up to about 15 degrees.

4. The differential case assembly of claim 2, wherein the base is disposed on a plane oriented orthogonal to the plane on which the weld joint interface is disposed.

5. The differential case assembly of claim 1, wherein a ledge is formed in the integral end cap and ring gear assembly, the ledge exposing the weld joint interface beneath each of the slots.

6. The differential case assembly of claim 1, wherein at least a portion of the integral end cap and ring gear assembly extends radially inwards beyond the exterior surface of the side wall of the differential case at the open end thereof.

7. The differential case assembly of claim 6, wherein the at least a portion of the integral end cap and ring gear assembly abuts a surface defining the open end of the differential case.

8. A differential case assembly, comprising:
   a gear assembly;
   a differential case having an open end and a side wall with an exterior surface, the open end having an opening configured to receive the gear assembly therethrough, at least a portion of the exterior surface of the side wall forming an outwardly extending lip adjacent the opening, the exterior surface of the side wall having a base spaced apart from the lip;
   an integral end cap and ring gear assembly disposed over the open end of the differential case and adjacent the exterior surface, the integral end cap and ring gear assembly covering a portion of the opening at the open end of the differential case and cooperating with the differential case to house the gear assembly, a first interior portion of the integral end cap and ring gear assembly abutting the exterior surface of the differential case to define a weld joint interface between the lip and the base, the integral end cap and ring gear assembly having a plurality of slots formed therethrough, each slot exposing a respective portion of the lip and the weld joint interface adjacent the lip, each slot permitting access to both the differential case and the integral end cap and ring gear assembly for a welding operation of the differential case to the integral end cap and ring gear assembly at the weld joint interface adjacent the lip;

a plurality of intermittent welds formed by the welding operation at the weld joint interface adjacent the respective portion of the lip exposed by each slot; and a minor void disposed at the weld joint interface between the exterior surface of the side wall of the differential case and the first interior portion of the integral end cap and ring gear assembly, the minor void permitting a collection of gases during the welding operation;

wherein a diameter of the weld joint interface decreases from the base towards the lip.

9. The differential case assembly of claim 8, wherein a ledge is formed in the integral end cap and ring gear assembly, the ledge exposing the weld joint interface beneath each of the slots.

10. The differential case assembly of claim 8, wherein a second interior portion of the integral end cap and ring gear assembly is spaced apart from the exterior surface and defines a void therebetween.

11. The differential case assembly of claim 10, wherein the void permits the welding operation of the differential case to the integral end cap and ring gear assembly at the weld joint interface.

12. The differential case assembly of claim 11, wherein the weld joint interface is disposed on a plane oriented at an acute angle relative to a central axis of the differential case.

13. The differential case assembly of claim 12, wherein the angle is up to about 15 degrees.

14. The differential case assembly of claim 12, wherein the base is disposed on a plane oriented orthogonal to the plane on which the weld joint interface is disposed.

15. A method for manufacturing a differential case assembly, the method comprising the steps of:

providing a differential case having an open end and a side wall with an exterior surface, the open end having an opening configured to receive a gear assembly therethrough, at least a portion of the exterior surface of the side wall forming an outwardly extending lip adjacent the opening, the exterior surface of the side wall having a base spaced apart from the lip;

disposing the gear assembly within the differential case through the opening in the open end;

disposing an integral end cap and ring gear assembly over the open end of the differential case and adjacent the exterior surface, the integral end cap and ring gear assembly covering a portion of the opening at the open end of the differential case and cooperating with the differential case to house the gear assembly, a first interior portion of the integral end cap and ring gear assembly abutting the exterior surface of the differential case to define a weld joint interface between the lip and the base, wherein a diameter of the weld joint interface decreases from the base towards the lip, the integral end cap and ring gear assembly having a plurality of slots formed therethrough, each slot exposing a respective portion of the lip and the weld joint interface adjacent the lip, each slot permitting access to both the differential case and the integral end cap and ring gear assembly for welding of the differential case to the integral end cap and ring gear assembly at the weld joint interface adjacent the lip; and welding the differential case with the integral end cap and ring gear assembly at the weld joint interface adjacent the lip to form a plurality of intermittent welds at the weld joint interface adjacent the respective portion of the lip exposed by each slot, wherein a minor void is disposed at the weld joint interface between the exterior surface of the side wall of the differential case and the first interior portion of the integral end cap and ring gear assembly, the minor void permitting a collection of gases during the welding.

16. The method of claim 15, wherein the welding includes a laser welding operation.

* * * * *